(12) United States Patent
Subramanian et al.

(10) Patent No.: US 11,968,013 B2
(45) Date of Patent: *Apr. 23, 2024

(54) BEAM MANAGEMENT USING SYNCHRONIZATION SIGNALS THROUGH CHANNEL FEEDBACK FRAMEWORK

(71) Applicant: QUALCOMM Incorporated, San Diego, CA (US)

(72) Inventors: Sundar Subramanian, San Diego, CA (US); Xiao Feng Wang, San Diego, CA (US); Junyi Li, Fairless Hills, PA (US); Juergen Cezanne, Ocean Township, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,090

(22) Filed: Dec. 27, 2021

(65) Prior Publication Data

US 2022/0231742 A1 Jul. 21, 2022

Related U.S. Application Data

(63) Continuation of application No. 16/673,530, filed on Nov. 4, 2019, now Pat. No. 11,211,986, which is a
(Continued)

(51) Int. Cl.
*H04L 5/12* (2006.01)
*H04B 7/06* (2006.01)
(Continued)

(52) U.S. Cl.
CPC ......... *H04B 7/0626* (2013.01); *H04B 7/0608* (2013.01); *H04B 7/063* (2013.01);
(Continued)

(58) Field of Classification Search
CPC .... H04B 7/0626; H04B 7/0608; H04B 7/063; H04B 7/0695; H04B 7/0632;
(Continued)

(56) References Cited

U.S. PATENT DOCUMENTS 9,198,070 B2 11/2015 Krishnamurthy et al.
9,642,165 B2 * 5/2017 Jung ................. H04W 74/0833
(Continued)

FOREIGN PATENT DOCUMENTS

JP W02018128187 A1 11/2019
JP WO-2018173232 A1 1/2020
(Continued)

OTHER PUBLICATIONS

LG Electronics: "Considerations on NR CSI-RS Design for Beam Management", 3GPP TSG RAN WG1 Meeting #88, R1-1702459, Athens, Greece Feb. 13-17, 2017, pp. 1-5.
(Continued)

*Primary Examiner* — Helene E Tayong
(74) *Attorney, Agent, or Firm* — Holland & Hart LLP

(57) ABSTRACT

Methods, systems, and devices for wireless communication are described. In aspects of the present disclosure, a user equipment (UE) may report metrics (e.g., received signal power, beam identifier) about synchronization signal (SS) beams using the same (e.g., or a similar) framework that is used for channel state information reference signal (CSI-RS) reporting. Because SSs are intended to be broadcast across a wide coverage area in a beamformed manner, the SSs represent a promising complement to existing beam management techniques. Accordingly, beam management may be achieved at least in part based on reporting one or more metrics of beamformed SSs through a channel feedback framework.

38 Claims, 14 Drawing Sheets

Related U.S. Application Data continuation of application No. 15/943,586, filed on Apr. 2, 2018, now Pat. No. 10,484,066.

(60) Provisional application No. 62/481,658, filed on Apr. 4, 2017.

(51) Int. Cl.
| | |
|---|---|
| *H04L 5/00* | (2006.01) |
| *H04L 25/02* | (2006.01) |
| *H04W 24/10* | (2009.01) |
| *H04W 56/00* | (2009.01) |

(52) U.S. Cl.
CPC ......... *H04B 7/0695* (2013.01); *H04L 5/0048* (2013.01); *H04L 25/0224* (2013.01); *H04W 24/10* (2013.01); *H04W 56/0015* (2013.01); *H04L 5/0023* (2013.01); *H04L 5/0053* (2013.01)

(58) Field of Classification Search
CPC .. H04B 7/0643; H04B 7/0619; H04B 7/0408; H04L 5/0048; H04L 25/0224; H04L 5/0023; H04L 5/0053; H04W 24/10; H04W 56/0015
USPC ....................................................... 375/262
See application file for complete search history.

(56) References Cited

U.S. PATENT DOCUMENTS

| | | | |
|---|---|---|---|
| 9,882,692 | B2 | 1/2018 | Kang et al. |
| 10,009,903 | B2 | 6/2018 | Kim et al. |
| 10,484,066 | B2 | 11/2019 | Subramanian et al. |
| 10,602,456 | B2 | 3/2020 | Li et al. |
| 10,693,586 | B2 | 6/2020 | Park et al. |
| 2013/0301450 | A1 | 11/2013 | Geirhofer et al. |
| 2013/0301454 | A1* | 11/2013 | Seol ..................... H04B 7/0695 370/252 |
| 2014/0010131 | A1 | 1/2014 | Gaal et al. |
| 2014/0056156 | A1 | 2/2014 | Jongren |
| 2015/0092768 | A1 | 4/2015 | Ng et al. |
| 2015/0349940 | A1 | 12/2015 | Kim et al. |
| 2015/0358931 | A1 | 12/2015 | Koorapaty et al. |
| 2016/0028519 | A1 | 1/2016 | Wei |
| 2016/0087706 | A1 | 3/2016 | Guey et al. |
| 2017/0126300 | A1 | 5/2017 | Park et al. |
| 2017/0238272 | A1 | 8/2017 | You et al. |
| 2017/0251460 | A1 | 8/2017 | Agiwal et al. |
| 2017/0331577 | A1 | 11/2017 | Parkvall et al. |
| 2018/0034612 | A1 | 2/2018 | Lin et al. |
| 2020/0067585 | A1 | 2/2020 | Subramanian et al. |

FOREIGN PATENT DOCUMENTS

| | | | |
|---|---|---|---|
| WO | WO-2015148815 | A1 | 10/2015 |
| WO | WO-2016179791 | A1 | 11/2016 |
| WO | WO-2018128187 | A1 | 7/2018 |
| WO | WO-2018173232 | A1 | 9/2018 |

OTHER PUBLICATIONS

Ericsson: "RS for Beam Management," 3GPP Draft; R1-1612346 RS for Beam Management, 3rd Generation Partnership Project (3GPP), Mobile Competence Centre; 650, Route Des Lucioles; F-06921, Sophia-Antipolis Cedex; France, vol. RAN WG1, No. Reno, Nevada; Nov. 14, 2016-Nov. 18, 2016, Nov. 5, 2016, XP051190406, 4 Pages, Retrieved from the Internet: URL: http://www.3gpp.org/ftp/tsg_ran/WG1_RL1/TSGR1_87/Docs/ [retrieved on Nov. 5, 2016].

Huawei, et al., "WF on Framework of Beam Management", 3GPP TSG RAN WG1 Meeting #88, R1-1703523, Athens, Greece, Feb. 13-17, 2017, 4 Pages, p. 3.

International Search Report and Written Opinion—PCT/US2018/025931—ISA/EPO—dated Jul. 11, 2018.

Qualcomm: "Beam Management for NR", 3GPP Draft; 3GPP TSG-RAN1 #88bis, R1-1705581, Beam Management for NR, 3rd Generation-Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 2, 2017 (Apr. 2, 2017), XP051243709, 7 pages, Retrieved from the Internet: URL: http://www.3gpp.org/ftp/Meetings_3GPP_SYNC/RAN1/Docs/ [retrieved on Apr. 2, 2017] the whole document.

Qualcomm: "Beam Management for NR", 3GPP TSG RAN1 #88, 3GPP Draft, R1-1702604_BEAM_MANAGEMENT_FOR_NR, 3GPP, vol. RAN WG1, No. Athens, Greece, Feb. 13, 2017-Feb. 17, 2017, 8 Pages, Feb. 12, 2017, XP051209757, Retrieved from the Internet: URL: http://www.3gpp.org/ftp/Meetings_3GPP_SYNC/RAN1/Docs/ [retrieved on Feb. 12, 2017], Chapters 1, 2.1 and 2.3.

Samsung, et al., "WF on Beam Reporting", 3GPP TSG RAN WG1 Meeting #87, R1-1701321, Spokane, USA, Jan. 16-20, 2017, 3 Pages, Agenda item 5.1.2.2.

Samsung, et al., "WF on CSI Framework for NR", 3GPP TSG RAN WG1 Meeting NR Ad Hoc, R1-1701292, Spokane, USA, Jan. 16-20, 2017, 5 Pages, Agenda item: 5.1.2.2.

Taiwan Search Report—TW107112068—TIPO—dated Nov. 30, 2021.

Zte, et al., "Discussion on Beam Recovery Mechanism", 3GPP TSG RAN WG1 Meeting #88bis, 3GPP Draft, R1-1704400 Discussion on Beam Recovery Mechanism, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017 (Apr. 2, 2017), XP051242548, 6 Pages, Retrieved from the Internet: URL: http://www.3gpp.org/ftp/Meetings_3GPP_SYNC/RAN1/Docs/ [retrieved on Apr. 2, 2017].

Zte, et al., "Composition of SS Block, Burst and Burst Set", 3GPP TSG RAN WG1 Meeting #88bis, R1-1704358, 3rd Generation Partnership Project, Mobile Competence Centre, 650, Route Des Lucioles, F-06921 Sophia-Antipolis Cedex, France, vol. RAN WG1, No. Spokane, USA, Apr. 3, 2017-Apr. 7, 2017, 10 Pages, Mar. 25, 2017, XP051251161.

European Search Report—EP23177631—Search Authority—Munich—Sep. 15, 2023.

* cited by examiner

BEAM MANAGEMENT USING SYNCHRONIZATION SIGNALS THROUGH CHANNEL FEEDBACK FRAMEWORK

CROSS REFERENCES

The present Application for Patent is a continuation of U.S. patent application Ser. No. 16/673,530 by Subramanian et al., entitled "Beam Management Using Synchronization Signals Through Channel Feedback Framework" filed Nov. 4, 2019, which is a continuation of U.S. patent application Ser. No. 15/943,586 by Subramanian, et al., entitled "Beam Management Using Synchronization Signals Through Channel Feedback Framework" filed Apr. 2, 2018, which claims the benefit of U.S. Provisional Patent Application No. 62/481,658 by Subramanian et al., entitled "Beam Management Using Synchronization Signals Through Channel Feedback Framework," filed Apr. 4, 2017, assigned to the assignee hereof, and expressly incorporated herein.

BACKGROUND

The following relates generally to wireless communication, and more specifically to beam management using synchronization signals (SSs) through channel feedback framework.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems (e.g., systems supporting millimeter wave (mmW) communications), beamforming may be used in order to overcome the relatively high path losses associated with frequencies in these systems. In order to support beamformed transmissions, communicating wireless devices (e.g., a base station and UE) may be operable to discover and maintain suitable beams for a given communication link. The set of procedures and protocols required for this task may be referred to as beam management. As an example, beam management may be based on a UE observing beamformed downlink signals and reporting one or more performance metrics for the respective beamformed signals to the base station. For example, channel state information reference signals (CSI-RS) associated with multiple transmission beams may be provided and channel state feedback may include reports indicating channel information for the best transmission beams. Improvements in providing channel feedback based on transmission beams from a base station may be desired.

SUMMARY

The described techniques relate to improved methods, systems, devices, or apparatuses that support beam management using synchronization signals (SSs) through channel feedback framework. In aspects of the present disclosure, a user equipment (UE) may report metrics (e.g., received signal power, beam identifier) about SS beams following the same framework used for channel state information reference signal (CSI-RS) reporting. Because some wireless systems (e.g., mmW systems) employ beamformed directional transmissions (e.g., of SSs and other signals) to overcome path loss complications, considerations for efficient reporting of beamformed signal properties (i.e., beam management) may benefit the system. Accordingly, beam management may be achieved at least in part based on reporting one or more metrics of beamformed SSs through a channel feedback framework.

A method of wireless communication at a UE is described. The method may include identifying a first feedback resource set and reporting configuration according to a channel state information (CSI) framework that indicates a set of SS blocks of an SS burst transmitted by a base station using a first set of transmission beams, performing first channel measurements for the set of SS blocks, and reporting, to the base station, a first resource indicator for at least one of the set of SS blocks based on the first channel measurements.

An apparatus for wireless communication at a UE is described. The apparatus may include a processor, memory in electronic communication with the processor, and instructions stored in the memory. The instructions may be executable by the processor to cause the apparatus to identify a first feedback resource set and reporting configuration according to a CSI framework that indicates a set of SS blocks of an SS burst transmitted by a base station using a first set of transmission beams, perform first channel measurements for the set of SS blocks, and report, to the base station, a first resource indicator for at least one of the set of SS blocks based on the first channel measurements.

Another apparatus for wireless communication at a UE is described. The apparatus may include means for identifying a first feedback resource set and reporting configuration according to a CSI framework that indicates a set of SS blocks of an SS burst transmitted by a base station using a first set of transmission beams, means for performing first channel measurements for the set of SS blocks, and means for reporting, to the base station, a first resource indicator for at least one of the set of SS blocks based on the first channel measurements.

A non-transitory computer-readable medium storing code for wireless communication at a UE is described. The code may include instructions executable by a processor to identify a first feedback resource set and reporting configuration according to a CSI framework that indicates a set of SS blocks of an SS burst transmitted by a base station using a first set of transmission beams, perform first channel measurements for the set of SS blocks, and report, to the base station, a first resource indicator for at least one of the set of SS blocks based on the first channel measurements.

In some examples of the method, apparatuses, and non-transitory computer-readable medium described herein, identifying the first feedback resource set and reporting configuration may include operations, features, means, or instructions for receiving the first feedback resource set and reporting configuration from the base station.

In some examples of the method, apparatuses, and non-transitory computer-readable medium described herein, reporting may include operations, features, means, or instructions for reporting a channel metric associated with the at least one of the set of SS blocks.

In some examples of the method, apparatuses, and non-transitory computer-readable medium described herein, the reporting occurs periodically, semi-persistently, or aperiodically as identified by the first reporting configuration.

In some examples of the method, apparatuses, and non-transitory computer-readable medium described herein, reporting aperiodically occurs based on a trigger, where the trigger may include operations, features, means, or instructions for receiving a reporting indicator in a downlink control information message or identifying a triggering event based on the first channel measurements.

In some examples of the method, apparatuses, and non-transitory computer-readable medium described herein, reporting may include operations, features, means, or instructions for reporting an indicator of an antenna port for at least one of the set of SS blocks.

Some examples of the method, apparatuses, and non-transitory computer-readable medium described herein may further include operations, features, means, or instructions for obtaining a second feedback resource set and reporting configuration according to the CSI framework, where the second feedback resource set and reporting configuration identifies a set of resources associated with a CSI-RS transmitted by a base station using a second set of transmission beams, performing second channel measurements for the CSI-RS and reporting according to the second reporting configuration, to the base station based on the second channel measurements, at least one channel metric for at least one of the set of resources associated with the CSI-RS and a second resource indicator of the at least one of the set of resources.

In some examples of the method, apparatuses, and non-transitory computer-readable medium described herein, the set of SS blocks includes a subset of SS blocks of the SS burst.

Some examples of the method, apparatuses, and non-transitory computer-readable medium described herein may further include operations, features, means, or instructions for identifying a waveform for the set of SS blocks for performing the first channel measurements based on decoding at least one SS block of the SS burst.

In some examples of the method, apparatuses, and non-transitory computer-readable medium described herein, the first feedback resource set configuration includes a spatial quasi-colocation indicator for at least one of the set of SS blocks, an indicator of resources for the set of SS blocks, an indicator of a duration of the SS burst, an indicator of antenna ports associated with the set of SS blocks, an indicator of a number of SS blocks of the SS burst, an indicator of a channel metric for reporting for the set of SS blocks, or a combination thereof.

A method of wireless communication at a base station is described. The method may include configuring, for a UE, a first feedback resource set and reporting configuration according to a CSI framework that indicates a set of SS blocks of an SS burst transmitted by the base station using a first set of transmission beams, receiving, from the UE, a first resource indicator of at least one of the set of SS blocks, and determining a characteristic of a transmission beam for a data or control transmission to the UE based on the first resource indicator.

An apparatus for wireless communication at a base station is described. The apparatus may include a processor, memory in electronic communication with the processor, and instructions stored in the memory. The instructions may be executable by the processor to cause the apparatus to configure, for a UE, a first feedback resource set and reporting configuration according to a CSI framework that indicates a set of SS blocks of an SS burst transmitted by the base station using a first set of transmission beams, receive, from the UE, a first resource indicator of at least one of the set of SS blocks, and determine a characteristic of a transmission beam for a data or control transmission to the UE based on the first resource indicator.

Another apparatus for wireless communication at a base station is described. The apparatus may include means for configuring, for a UE, a first feedback resource set and reporting configuration according to a CSI framework that indicates a set of SS blocks of an SS burst transmitted by the base station using a first set of transmission beams, means for receiving, from the UE, a first resource indicator of at least one of the set of SS blocks, and means for determining a characteristic of a transmission beam for a data or control transmission to the UE based on the first resource indicator.

A non-transitory computer-readable medium storing code for wireless communication at a base station is described. The code may include instructions executable by a processor to configure, for a UE, a first feedback resource set and reporting configuration according to a CSI framework that indicates a set of SS blocks of an SS burst transmitted by the base station using a first set of transmission beams, receive, from the UE, a first resource indicator of at least one of the set of SS blocks, and determine a characteristic of a transmission beam for a data or control transmission to the UE based on the first resource indicator.

In some examples of the method, apparatuses, and non-transitory computer-readable medium described herein, receiving may include operations, features, means, or instructions for receiving a channel metric associated with the at least one of the set of SS blocks.

In some examples of the method, apparatuses, and non-transitory computer-readable medium described herein, receiving may include operations, features, means, or instructions for receiving an indicator of an antenna port for the at least one of the set of SS blocks.

In some examples of the method, apparatuses, and non-transitory computer-readable medium described herein, the first feedback resource set and reporting configuration includes an indication for periodic, semi-persistent, or aperiodic reporting, a spatial quasi-colocation indicator for at least one of the set of SS blocks, an indicator of resources for the set of SS blocks, an indicator of a duration of the SS burst, an indicator of antenna ports associated with the set of SS blocks, an indicator of a number of SS blocks of the SS burst, an indicator of a channel metric for reporting for the set of SS blocks, or a combination thereof.

In some examples of the method, apparatuses, and non-transitory computer-readable medium described herein, the set of SS blocks includes a subset of SS blocks of the SS burst.

Some examples of the method, apparatuses, and non-transitory computer-readable medium described herein may further include operations, features, means, or instructions for configuring, for the UE, a second feedback resource set and reporting configuration according to the CSI framework, where the second feedback resource set and reporting configuration identifies a set of resources associated with a CSI-RS transmitted by the base station using a second set of transmission beams and receiving, from the UE, at least one channel metric for at least one of the set of resources associated with the CSI-RS and a second resource indicator of the at least one of the set of resources, where the determining the characteristic of the transmission beam may be based on the at least one channel metric.

DETAILED DESCRIPTION

Some wireless communications systems employ beamforming in order to overcome communication range limitations that result from relatively high path losses associated with frequencies in the system. To support these beamformed transmissions, communicating devices may periodically measure one or more metrics associated with one or more beamformed transmissions, a process which is a part of beam management. For example, beam management may include beam selection and switching, beam recovery, beam optimization, and the like. For example, a base station may select a more suitable beam when a previously selected beam becomes obsolete (e.g., because of movement of the devices or some other factor affecting the communications). Because synchronization signals (SSs) are intended to be broadcast across a wide coverage area in a beamformed manner, the SSs represent a promising complement to existing beam management techniques. Accordingly, and as described further below, SSs may assist beam management through the channel feedback framework.

Aspects of the disclosure are initially described in the context of a wireless communications system. Aspects of the disclosure are then illustrated by and described with reference to configuration messages and process flows. Aspects of the disclosure are further illustrated by and described with reference to apparatus diagrams, system diagrams, and flowcharts that relate to beam-aware handover procedure for multi-beam access systems.

Figure 1:
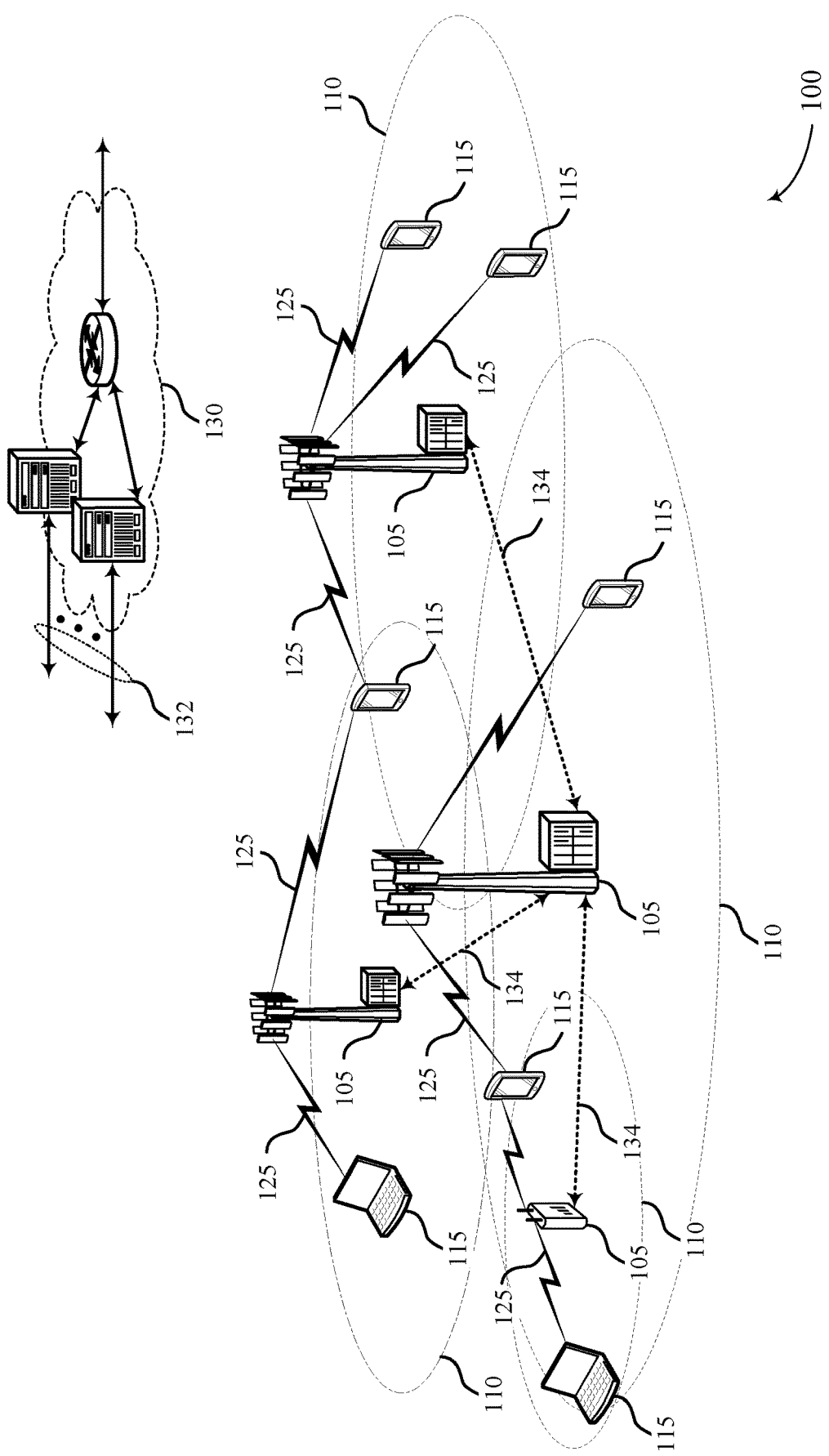
FIG. 1 illustrates an example of a system for wireless communication that supports beam management using synchronization signals (SSs) through channel feedback framework in accordance with aspects of the present disclosure.

FIG. 1 illustrates an example of a wireless communications system 100 in accordance with various aspects of the present disclosure. The wireless communications system 100 includes base stations 105, user equipments (UEs) 115, and a core network 130. In some examples, the wireless communications system 100 may be a Long Term Evolution (LTE) network, LTE-Advanced (LTE-A) network, or a 5G new radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the efficient use of resources by enabling SS reporting for beam management through reuse of the channel state information reference signal (CSI-RS) reporting framework.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some instances, a base station 105 facilitates the scheduling of resources for D2D communications. In other cases, D2D communications are carried out independently of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, S2). Base stations 105 may communicate with one another over backhaul links 134 (e.g., X1, X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105, next generation NodeBs (gNBs) 105, etc.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the physical layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," and "channel" may be used interchangeably herein. A UE 115 may be configured with multiple downlink CCs and one or more uplink CCs for CA. CA may be used with both frequency division duplex (FDD) and time division duplex (TDD) CC.

In some cases, wireless communications system 100 may utilize enhanced component carriers (eCCs). An eCC may be characterized by one or more features including wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may include one or multiple symbols. In some cases, the TTI duration (that is, the number of symbols in a TTI) may be variable. In some instances, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz) at reduced symbol durations (e.g., 16.67 microseconds). A TTI in eCC may include one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Wireless communications system 100 may operate in an ultra-high frequency (UHF) region using frequency bands from 300 MHz to 3 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. Wireless communications system 100 may also operate in a super high frequency (SHF) region using frequency bands from 3 GHz to 30 GHz, otherwise known as the centimeter band. In some cases, wireless communication system 100 may also utilize extremely high frequency (EHF) portions of the spectrum (e.g., from 25 GHz to 300 GHz), also known as the millimeter band. Systems that use this region may be referred to as millimeter wave (mmW) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

Wireless communications system 100 may support mmW communications between UEs 115 and base stations 105. Devices operating in mmW, SHF, or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the SSs. Multiple-input multiple-output (MIMO) wireless systems use a transmission scheme between a transmitter (e.g., a base station 105) and a receiver (e.g., a UE 115), where both transmitter and receiver are equipped with multiple antennas.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

MIMO wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving SSs (e.g., or other reference signals such as CSI-RS). Each of these beams may be referred to as a receive beam in aspects of the present disclosure.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Synchronization (e.g., cell acquisition) may be performed using SSs or channels transmitted by a synchronization source (e.g., a base station 105). A base station may transmit SS blocks containing discovery reference signals. SS blocks may include a primary synchronization signal (PSS), a secondary synchronization signal (SSS), or a physical broadcast channel (PBCH). A UE 115 attempting to access a wireless network may perform an initial cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS. The SSS may enable radio frame synchronization, and may provide a cell group identity value, which may be combined with the physical layer identifier to form the physical cell identifier (PCID) which identifies the cell. The SSS may also enable detection of a duplexing mode and a cyclic prefix (CP) length. An SSS may be used to acquire other system information (e.g., subframe index). The PBCH may be used to acquire additional system information needed for acquisition (e.g., bandwidth, frame index).

In some cases, SS blocks may be transmitted in a beamformed manner. Because a base station may not know the locations of devices attempting to synchronize with a cell, SS blocks may be successively transmitted in a beam swept manner, as described further below. In aspects of the present disclosure, the decoded waveforms of the SS blocks may effectively serve as reference signals and be used to indicate the quality of a given beam pair link. Accordingly, a UE 115 may receive a beamformed SS block and report information based on measurements of the received SS block relative to the decoded waveform to the base station 105. The base station 105 may in turn use the reported information for a variety of purposes (e.g., scheduling, transmission power control). Various configurations for reporting information (e.g., which metrics to report, which beams to measure, periodicity of measurements, periodicity of reports) are considered herein.

Figure 2:
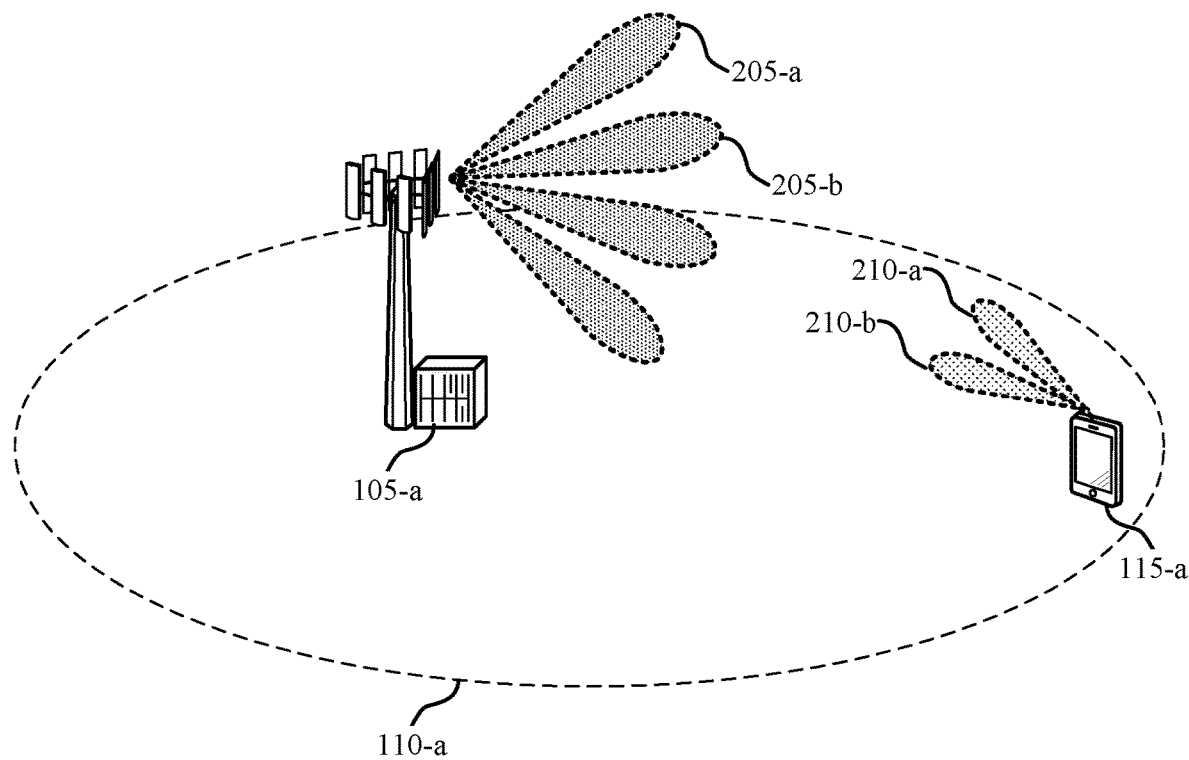
FIG. 2 illustrates an example of a wireless communications system that supports beam management using SSs through channel feedback framework in accordance with aspects of the present disclosure.

FIG. 2 illustrates an example of a wireless communications system 200 that supports beam management using SSs through channel feedback framework in accordance with various aspects of the present disclosure. Wireless communications system 200 includes a base station 105-a and a UE 115-a, each of which may be an example of the corresponding device described with reference to FIG. 1.

Wireless communications system 200 may operate in frequency ranges that are associated with beamformed transmissions between base station 105-a and UE 115-a. For example, wireless communication system 200 may operate using mmW frequency ranges. As a result, signal processing techniques, such as beamforming may be used to combine energy coherently and overcome path losses.

By way of example, base station 105-a may contain multiple antennas. In some cases, each antenna may transmit a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-a of the base station 105-a or otherwise benefit the wireless communications system 200.

Transmit beams 205-a and 205-b represent examples of beams over which information may be transmitted. Accordingly, each transmit beam 205 may be directed from base station 105-a toward a different region of the coverage area 110-a and in some cases, two or more beams 205 may overlap. Transmit beams 205-a and 205-b may be transmitted simultaneously or at different times. In either case, a UE 115-a may be capable of receiving one or more transmit beams 205 via respective receive beams 210-a, 210-b.

In one example, UE 115-a may form one or more receive beams 210-a, 210-b. Similar to base station 105-a, UE 115-a may contain multiple antennas. The receive beams 210-a, 210b may each receive one of the transmit beams 205-a and 205b (e.g., UE 115-a may be positioned within wireless communication systems 200 such that UE 115-a receives both beamformed transmit beams 205). Such a scheme may be referred to as a receive-diversity scheme. In some cases, the receive beams 210 may receive a single transmit beam 205-a (e.g., receive beam 210-a may receive the transmit beam 205-a with various pathloss and multipath effects included). That is, each antenna of UE 115-a may receive the transmit beam 205-a which has experienced different path losses or phase shifts (e.g., different phase shifts may be due to the different path lengths between the base station 105-a and the respective antennas of the UE 115-a) and appropriately combine the received signals that is represented by receive beam 210. A transmit beam 205 and a corresponding receive beam 210 may in some cases be referred to as a beam pair link. Various methods for identifying a desired beam pair link are considered within the scope of the present disclosure. For example, in some cases base station 105-a may repeat transmissions over multiple transmit beams 205 (e.g., in every direction) and UE 115-a may report the strongest received beam 205 (e.g., without necessarily trying multiple receive beams 210). Additionally or alternatively, base station 105-a may transmit multiple transmit beams 205 over a small angular region (e.g., to assist a UE 115-a in fine-tuning the selected transmit beam 205). Further, in some cases, base station 105-a may repeat transmission of a single transmit beam (e.g., transmit beam 205-a) multiple times (e.g., to allow UE 115-a to compare multiple receive beams 210).

In some examples, transmit beams 205 may carry CSI-RS and/or SS. Base station 105-a may transmit to UE 115-a using multiple transmit beams 205, and UE 115-a may use different antenna sub-arrays to create various receive beams 210. For instance, during a cell acquisition procedure, the UE 115-a may receive one or more transmit beams 205 using different receive beams 210 and may determine the transmit beam 205 and receive beam 210 pairing that has the strongest signal (i.e., has the highest measured signal strength or highest signal to noise ratio (SNR)). Throughout communications, the UE 115-a may reassess the transmit beam 205 and receive beam 210 pairing (e.g., which may be part of beam management) based on various SS blocks and CSI-RS transmissions.

As described herein, the virtual antenna ports and waveforms associated with a given SS block may be referred to as a resource (e.g., such that each SS block may form a separate resource). A similar definition may apply to CSI-RS (e.g., in which the waveforms associated with a resource may stretch over a single or several symbols). Accordingly, measurements made by UE 115-a (e.g., reference signal receive power (RSRP), channel quality indicator (CQI)) may be made relative to a resource. In various examples, base station 105-a may transmit the waveforms over several resources and request that UE 115-a compare their performance with regard to one or more specified metrics (e.g., RSRP, SNR, CQI). A collection of resources for comparison may be referred to as a resource set. In some cases, UE 115-a may be asked to report one or more metrics of each resource or of a requested number of resources (e.g., the N best resources) together with their CSI-RS resource indicator (CRI). The set of transmit beams 205 (e.g., containing the SS blocks) which cover all spatially relevant directions of the cell may be referred to herein as an SS burst. An SS burst may have, for example, 128 SS blocks, and in some cases an SS burst may be partitioned into subsets of SS blocks.

In some instances, unified reporting for SS blocks and CSI-RS may be achieved by looking at the similarities between the SS blocks and the CSI-RS. For example, after UE 115-a has decoded the contents of the SS blocks, the decoded waveforms can be viewed as reference signals (e.g., similarly to the waveforms of CSI-RS). In either case, UE 115-a receives a known waveform over a stretch of time from a set of antenna ports of the base station 105 that are associated with a given transmit beam 205. Accordingly, base station 105-a may, for example, ask UE 115-a about the SS block(s) associated with the transmit beam(s) 205 which are best suited for communication with the UE 115-a. The UE 115-a may report, for example, the RSRP and CRI identifying the SS block associated with the best transmit beam 205.

Within the CSI-RS framework, the base station 105-a may provide the details of the UE 115-a reporting procedure for each of multiple resource sets, etc. For example, the details may specify what UE 115-a measures (e.g., the resources associated with a resource set) when UE 115-a reports (e.g., periodically, semi-persistently, aperiodically based on a trigger, autonomously) and what metrics UE 115-a should report (e.g., CQI, RSRP, SNR). A resource set may be configured including resources of the SS burst, and the base station 105-a may similarly configure the details of the UE 115-a reporting procedure. For example, base station 105-a may ask the UE 115-a to report periodically or based on a trigger (e.g., aperiodically). The trigger may be based on a certain downlink control information (DCI) or a certain condition (e.g., when the metric of a resource becomes better than the metric of a previously identified best resource after accounting for a certain hysteresis).

Figure 3:
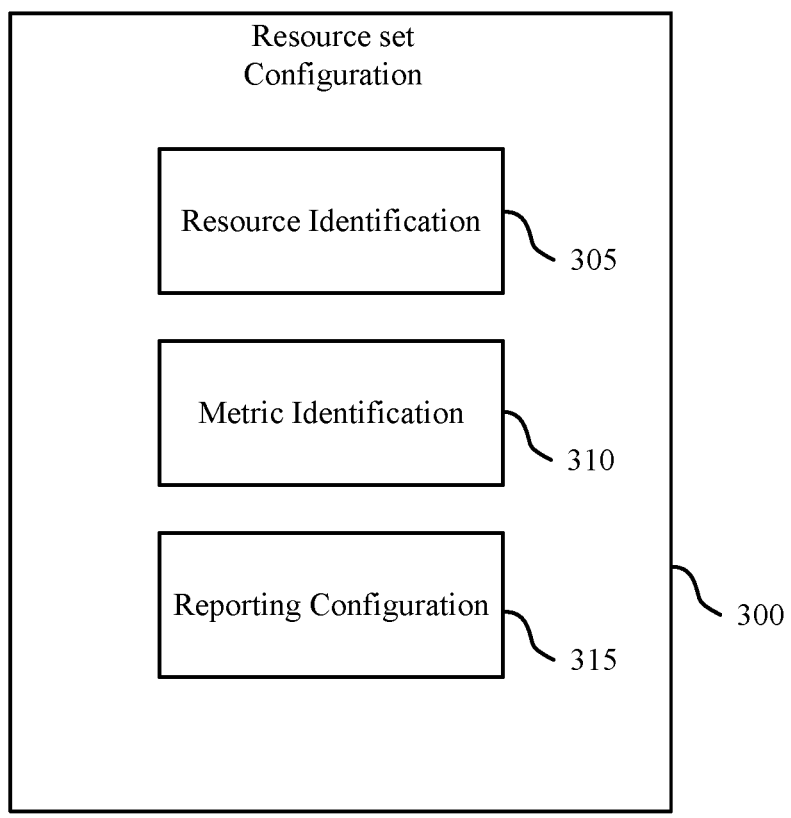
FIG. 3 illustrates an example of a configuration message that supports beam management using SSs through channel feedback framework in accordance with aspects of the present disclosure.

FIG. 3 illustrates an example of a resource set configuration 300 that supports beam management using SSs through channel feedback framework in accordance with various aspects of the present disclosure. In some examples, resource set configuration 300 may be transmitted from a base station 105 to a UE 115 (e.g., via RRC signaling, a control channel). In some cases, various specifications of resources and resource sets described below may be left partially or completely predetermined (e.g., programmed into devices upon provisioning on a network, hardcoded).

For example, a base station 105 may configure a UE 115 for the entire CSI-RS procedure immediately after the UE 115 has accessed the system (e.g., performed a connection procedure on a cell of the system). Similarly, the base station 105 may configure the UE 115 for measuring and reporting information about beams (e.g., transmit beams and/or receive beams) associated with one or more SS blocks in accordance with aspects of the present disclosure. That is, after system access, the base station 105 may provide the details of what to measure and how to report with regards to the SS blocks. For example, resource set configuration 300 may include resource identification field 305. Resource identification field 305 may define resources (e.g., SS burst, SS blocks, CSI-RS) to be measured by the UE 115. For example, the base station 105 may indicate in the resource identification field 305 which SS blocks of an SS burst are in the resource set. This information may support the UE 115 in finding suitable receive antenna arrays and receive patterns to optimally detect the SS blocks. Additionally or alternatively, the base station 105 may indicate in the resource identification field 305 the times when the SS blocks are transmitted and the duration of SS burst. Such information may be helpful, for example, if the UE 115 is asked to monitor the SS blocks of other neighboring base stations 105 for non-synchronized cells. Finally, in some cases, the resource identification field 305 may carry information relating to a codebook of precoding matrices to determine how to linearly combine antenna ports to achieve a single or multilayer transmission of a resource set. In some cases, the number of layers may be limited by the capability of the UE 115 and the number of virtual antenna ports involved in transmitting the SS block.

Resource set configuration 300 may include metric identification field 310 and/or reporting configuration field 315. For example, metric identification field 310 may specify which metrics the UE 115 is to measure relating to the transmitted SS blocks. Reporting configuration field 315 may specify how the UE 115 is to report the measured metrics (e.g., periodically, semi-persistently, aperiodically following a trigger, autonomously). Resource set configuration 300 may additionally include other fields (e.g., such that the illustrated fields are included for example purposes only). For example, resource set configuration 300 may include an indicator of which SS blocks are associated with quasi collocated (QCL) beams (e.g., beams that point into similar directions). Further, though illustrated separately for the sake of explanation, information associated with the various fields described above may in some cases be combined (e.g., such that a given metric may always be associated with periodic transmission).

In some cases, a base station 105 may configure a UE 115 for multiple resource set configurations 300 for concurrent operation. For example, each resource set configuration 300 may indicate different resources, and different UE 115 or groups of UEs 115 may be configured differently (e.g., based on a location within the coverage area).

Alternative methods of defining (e.g., and configuring) resources and resource sets are also considered. For example, in some cases SS blocks of an SS burst may be partitioned into groups (e.g., SS burst subsets), and a UE 115 may be asked to identify one or more groups of resources within the SS burst. In some examples, the groups may be communicated to the UE 115 at the time of configuration (e.g., after system access) or may be defined (e.g., by some specification). For example, such an approach may be useful if there is a large number of SS blocks and the base station 105 does not want to wait until the end of the entire SS burst before the base station 105 receives a report. Accordingly, such an approach may be associated with lower latency.

Also considered is an approach in which all the SS blocks of the SS burst form a single resource with multiple antenna ports. In some cases, a codebook of precoding matrices may be used such that only one or two antenna ports may be combined to form a layer. Accordingly, if RSRP is defined as the performance metric (e.g., in metric identification field 310), the UE 115 may automatically search for the SS block with the highest RSRP and report it (e.g., based on reporting configuration field 315) using the associated precoding matrix indicator. This may be used, for example, when the base station 105 transmits multiple SS blocks at the same time (e.g., in the same slot) using multiple concurrent transmit beams. The UE 115 may report a precoding matrix indicator (PMI) or other index to the codebook that identifies the antenna port having the highest performance metric. The UE 115 may additionally report the performance metric. Accordingly, the UE 115 may report RSRP/CQI together with a PMI (e.g., in addition to or instead of a CRI).

In accordance with various techniques described herein, SSs may assist in beam management through the use of the channel feedback framework. A base station 105 may periodically transmit a plurality of SS blocks that are beamformed into multiple spatial directions. In some cases, the base station 105 and/or predetermined information may define what portion of the transmitted SS blocks constitute a resource or a resource set. The base station 105 may configure the UE 115 for measurements and reporting using the framework of CSI-RS applied to the defined resources and resource sets. The UE 115 may report information about the beamformed SS blocks according to the configuration. In some examples, the base station 105 configures the UE 115 to report the RSRP or CQI for the best resource along with a CRI. In some cases, the base station configures the UE 115 to report with a certain periodicity or upon occurrence of certain triggers.

Figure 4:
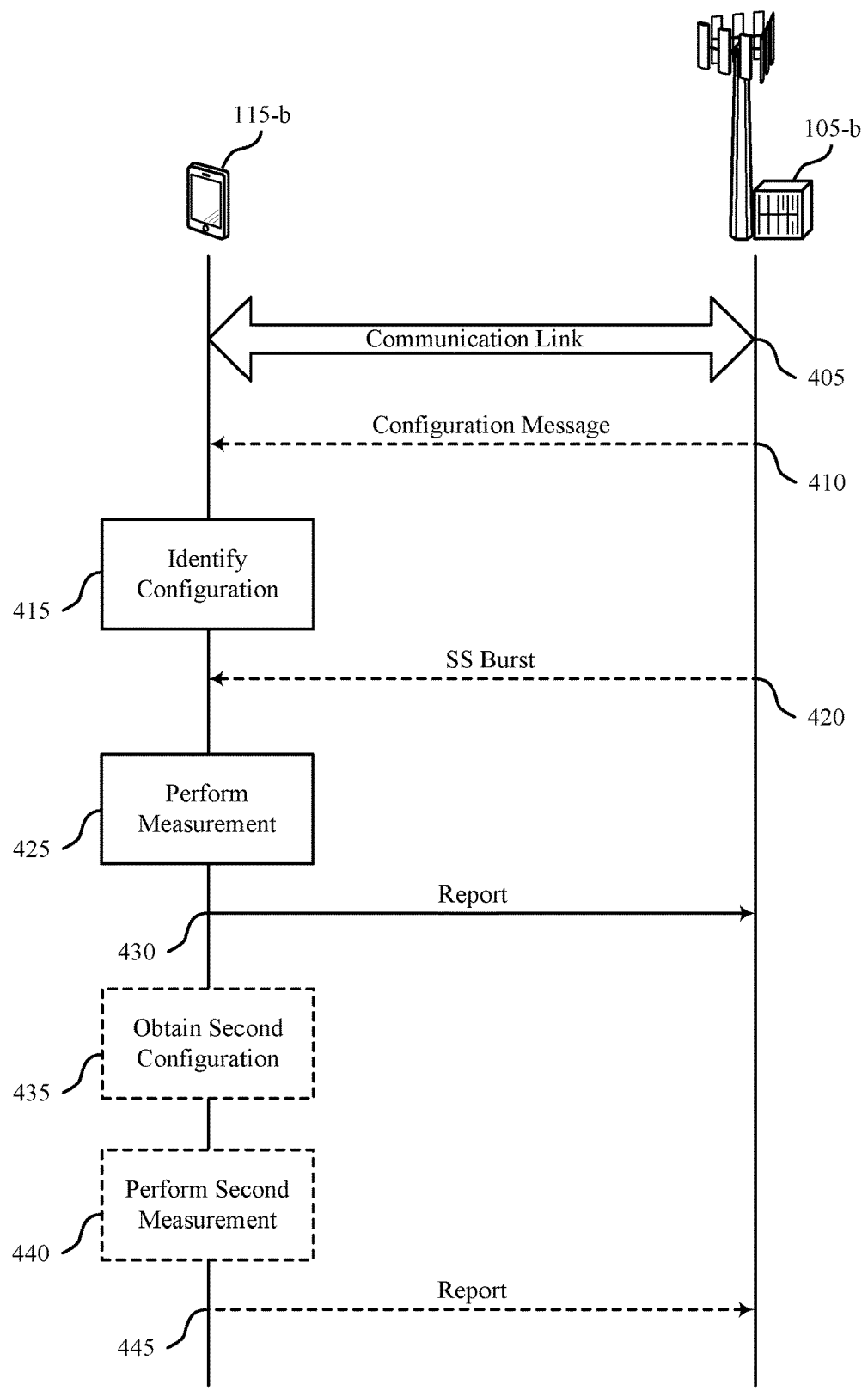
FIG. 4 illustrates an example of a process flow that supports beam management using SSs through channel feedback framework in accordance with aspects of the present disclosure.

FIG. 4 illustrates an example of a process flow 400 that supports beam management using SSs through channel feedback framework in accordance with various aspects of the present disclosure. Process flow 400 includes a UE 115b and base station 105-b, each of which may be an example of the corresponding device described above with reference to FIGS. 1 and 2.

At 405, base station 105b and UE 115b may establish a communication link (e.g., which may be an example of a communication link 125 as described with reference to FIG. 1). For example, the communication link at 405 may support beamformed communications.

At 410, base station 105b may optionally transmit a configuration message to UE 115-b. The configuration message may include, for example, one or more fields of a resource set configuration 300 described with reference to FIG. 3. Accordingly, at 410, base station 105b may configure for UE 115-b, according to a channel state information (CSI) framework, a first feedback resource set and reporting configuration.

At 415, UE 115b may identify a first feedback resource set and reporting configuration that indicates a plurality of SS blocks of an SS burst transmitted by base station 105b using a first set of transmission beams. In some cases, the identification of the configuration may be based on the configuration message received at 410. That is, the identifying the first feedback resource set and reporting configuration may include receiving the first feedback resource set and reporting configuration from the base station 105-b. In examples, the plurality of SS blocks may include a subset of SS blocks of the SS burst. In some cases, the first feedback resource set and reporting configuration includes a spatial QCL indicator for at least one of the plurality of SS blocks, an indicator of resources for the plurality of SS blocks, an indicator of a duration of the SS burst, an indicator of antenna ports associated with the plurality of SS blocks, an indicator of a number of SS blocks of the SS burst, an indicator of a channel metric for reporting for the plurality of SS blocks, or a combination thereof.

At 420, UE 115b may receive the SS burst form the base station 105-b. In some cases, the UE 115b may identify a waveform for the plurality of SS blocks for performing the first channel measurements based at least on decoding at least one SS block of the SS burst received at 420.

At 425, UE 115b may perform first channel measurements for the plurality of SS blocks. In aspects, the first channel measurements may be based on the configuration identified at 415.

At 430, UE 115b may report, to base station 105-b, a first resource indicator for at least one of the plurality of SS blocks based on the first channel measurements. In some cases, base station 105b may determine a characteristic of a transmission beam for a transmission (e.g., data transmission, control transmission, future transmissions, current transmissions) to UE 115b based on the first resource indicator. In some examples, the reporting includes reporting a channel metric associated with at least one of the plurality of SS blocks. In some cases, the report includes an indicator of an antenna port for at least one of the plurality of SS blocks. In aspects, the reporting may occur periodically, semi-persistently, or aperiodically as identified by the first feedback reporting configuration. In some cases, reporting aperiodically may occur based on a trigger, where the trigger includes receiving a reporting indicator in a DCI message or identifying a triggering event based on the channel measurements performed at 425.

At 435, UE 115b may optionally obtain a second feedback resource set and reporting configuration identifying a set of resources associated with a CSI-RS transmitted by base station 105b using a second set of transmission beams (which may be the same or different from the transmission beams used to transmit the SS burst at 420). In some cases, the second configuration may be obtained at the same time as and/or in a similar manner to the first configuration (e.g., may be obtained in the configuration message at 410 or a similar message).

At 440, UE 115b may perform second channel measurements for the CSI-RS based on the second configuration.

At 445, UE 115b may report according to the second reporting configuration, to base station 105b and based on the second channel measurements performed at 440, at least one channel metric for at least one of the set of resources associated with the CSI-RS and a second resource indicator of the at least one of the set of resources.

Figure 5:
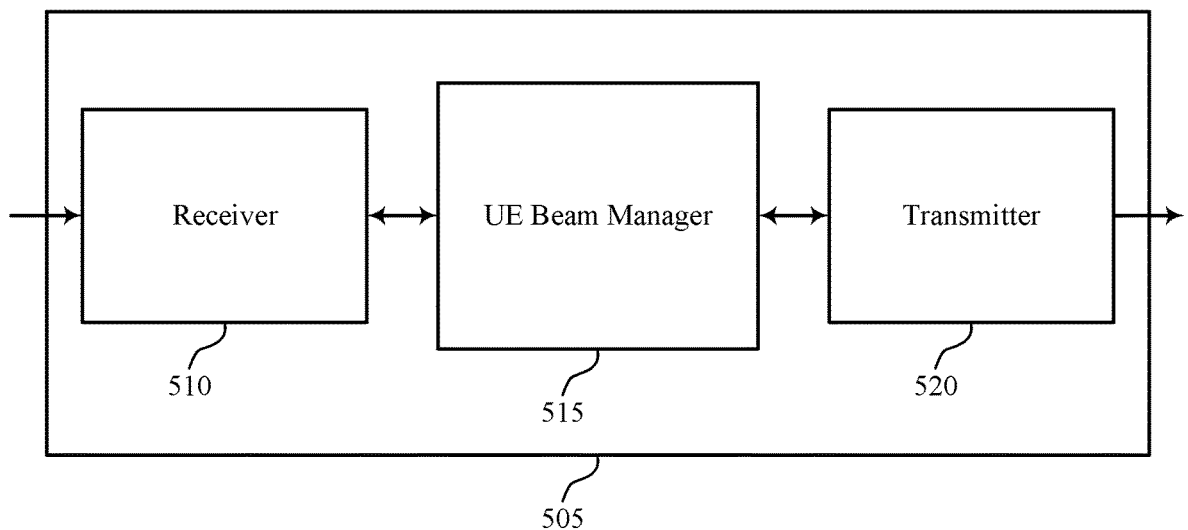
FIGS. 5 through 7 show block diagrams of a device that supports beam management using SSs through channel feedback framework in accordance with aspects of the present disclosure.

FIG. 5 shows a block diagram 500 of a wireless device 505 that supports beam management using SSs through channel feedback framework in accordance with aspects of the present disclosure. Wireless device 505 may be an example of aspects of a UE 115 as described herein. Wireless device 505 may include receiver 510, UE beam manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to beam management using SSs through channel feedback framework). Information may be passed on to other components of the device. The receiver 510 may be an example of aspects of the transceiver 835 described with reference to FIG. 8. The receiver 510 may utilize a single antenna or a set of antennas.

UE beam manager 515 may be an example of aspects of the UE beam manager 815 described with reference to FIG. 8.

UE beam manager 515 and/or at least some of its various sub-components may be implemented in hardware, software executed by a processor, firmware, or any combination thereof. If implemented in software executed by a processor, the functions of the UE beam manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE beam manager 515 and/or at least some of its various sub-components may be physically located at various positions, including being distributed such that portions of functions are implemented at different physical locations by one or more physical devices. In some examples, UE beam manager 515 and/or at least some of its various sub-components may be a separate and distinct component in accordance with various aspects of the present disclosure. In other examples, UE beam manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE beam manager 515 may identify a first feedback resource set and reporting configuration according to a CSI framework that indicates a set of SS blocks of an SS burst transmitted by a base station using a first set of transmission beams, perform first channel measurements for the set of SS blocks, and report, to the base station, a first resource indicator for at least one of the set of SS blocks based on the first channel measurements.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
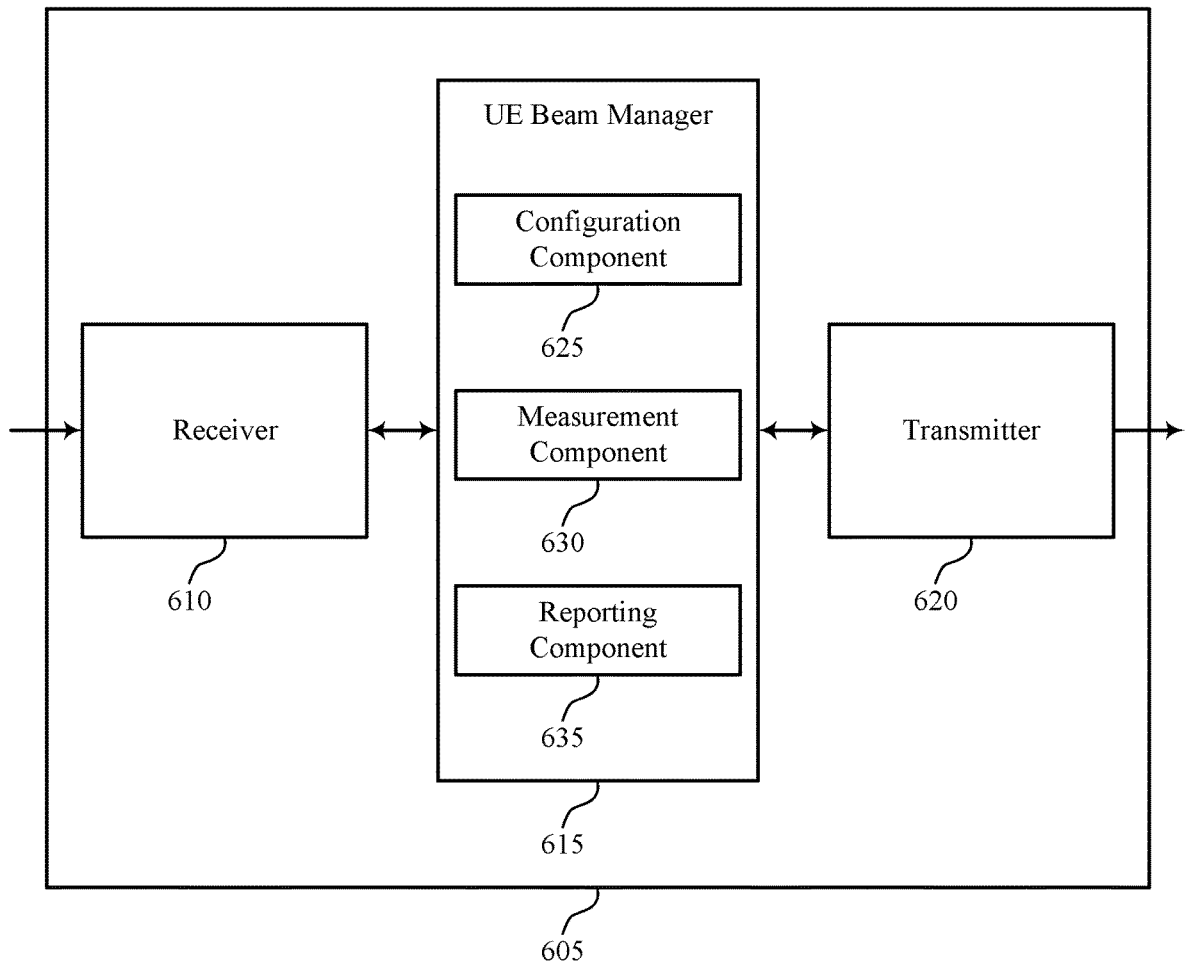

FIG. 6 shows a block diagram 600 of a wireless device 605 that supports beam management using SSs through channel feedback framework in accordance with aspects of the present disclosure. Wireless device 605 may be an example of aspects of a wireless device 505 or a UE 115 as described with reference to FIG. 5. Wireless device 605 may include receiver 610, UE beam manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to beam management using SSs through channel feedback framework). Information may be passed on to other components of the device. The receiver 610 may be an example of aspects of the transceiver 835 described with reference to FIG. 8. The receiver 610 may utilize a single antenna or a set of antennas.

UE beam manager 615 may be an example of aspects of the UE beam manager 815 described with reference to FIG. 8.

UE beam manager 615 may also include configuration component 625, measurement component 630, and reporting component 635.

Configuration component 625 may identify a first feedback resource set and reporting configuration according to a CSI framework that indicates a set of SS blocks of an SS burst transmitted by a base station using a first set of transmission beams and obtain a second feedback resource set and reporting configuration identifying a set of resources associated with a CSI-RS transmitted by a base station using a second set of transmission beams. In some cases, the set of SS blocks includes a subset of SS blocks of the SS burst. In some cases, the identifying the first feedback resource set and reporting configuration includes receiving the first feedback resource set and reporting configuration from the base station. In some cases, the first feedback resource set and reporting configuration includes a spatial quasi-colocation indicator for at least one of the set of SS blocks, an indicator of resources for the set of SS blocks, an indicator of a duration of the SS burst, an indicator of antenna ports associated with the set of SS blocks, an indicator of a number of SS blocks of the SS burst, an indicator of a channel metric for reporting for the set of SS blocks, or a combination thereof.

Measurement component 630 may perform first channel measurements for the set of SS blocks and perform second channel measurements for the CSI-RS.

Reporting component 635 may report according to the second reporting configuration, to the base station, a first resource indicator for at least one of the set of SS blocks based on the first channel measurements and report, to the base station based on the second channel measurements, at least one channel metric for at least one of the set of resources associated with the CSI-RS and a second resource indicator of the at least one of the set of resources. In some cases, the reporting includes reporting a channel metric associated with the at least one of the set of SS blocks. In some cases, the reporting includes reporting an indicator of an antenna port for at least one of the set of SS blocks. In some cases, the reporting may occur periodically, semi-persistently, or aperiodically as identified by the first feedback reporting configuration.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
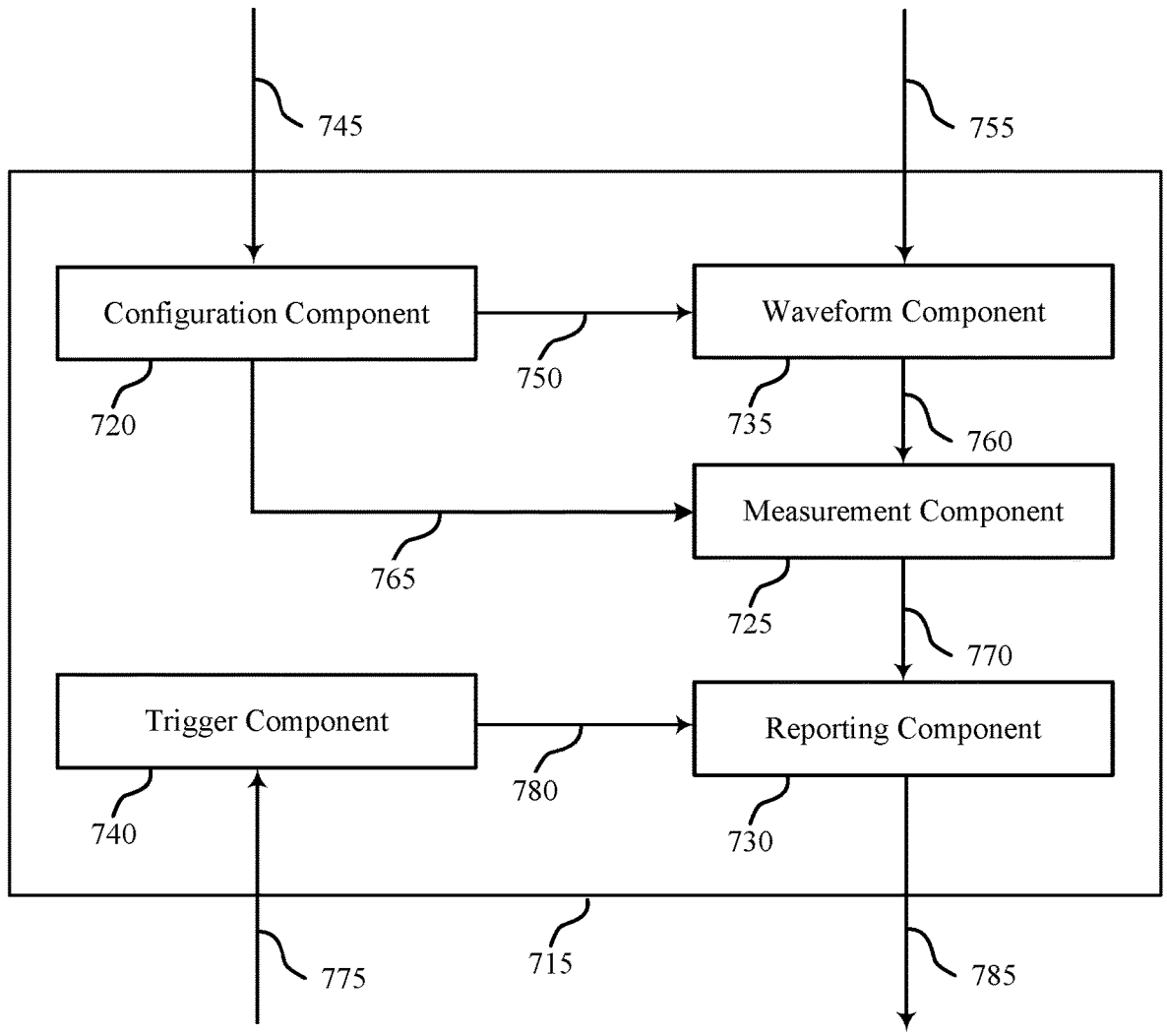

FIG. 7 shows a block diagram 700 of a UE beam manager 715 that supports beam management using SSs through channel feedback framework in accordance with aspects of the present disclosure. The UE beam manager 715 may be an example of aspects of a UE beam manager 515, a UE beam manager 615, or a UE beam manager 815 described with reference to FIGS. 5, 6, and 8. The UE beam manager 715 may include configuration component 720, measurement component 725, reporting component 730, waveform component 735, and trigger component 740. Each of these modules may communicate, directly or indirectly, with one another (e.g., via one or more buses).

Configuration component 720 may receive signal 745 (e.g., via a receiver 510 or 610), and may identify a first feedback resource set and reporting configuration according to a CSI framework that indicates a set of SS blocks of an SS burst transmitted by a base station using a first set of transmission beams and obtain a second feedback resource set and reporting configuration according to the CSI framework, where the second feedback resource set and reporting configuration identifies a set of resources associated with a CSI-RS transmitted by a base station using a second set of transmission beams. In some cases, the set of SS blocks includes a subset of SS blocks of the SS burst.

In some cases, the identifying the first feedback resource set and reporting configuration includes receiving the first feedback resource set and reporting configuration from the base station. In some other cases, the first feedback resource set and reporting configuration includes a spatial quasi-colocation indicator for at least one of the set of SS blocks, an indicator of resources for the set of SS blocks, an indicator of a duration of the SS burst, an indicator of antenna ports associated with the set of SS blocks, an indicator of a number of SS blocks of the SS burst, an indicator of a channel metric for reporting for the set of SS blocks, or a combination thereof. Configuration component 720 may pass information 750 indicating the set of SS blocks for performing the channel measurements to waveform component 735. Configuration component 720 may also pass information 765 indicating the channel metric for reporting to measurement component 725.

Waveform component 735 may identify a waveform 755 received (e.g., via a transmitter 520 or 620) for the set of SS blocks for performing the first channel measurements based on decoding at least one SS block of the SS burst, where the at least one SS block of the SS burst may be indicated in information 750. Waveform component 735 may relay the waveform for performing channel measurements to measurement component 725 via information 760.

Measurement component 725 may perform first channel measurements indicated in information 765 for the set of SS blocks. Measurement component 725 may perform second channel measurements for the CSI-RS. Measurement component 725 may pass along channel measurements 770 to reporting component 730.

Reporting component 730 may report, to the base station, information 785 relating to the channel measurements. That is, reporting component 730 may report, to the base station, a first resource indicator for at least one of the set of SS blocks based on the first channel measurements and report, to the base station based on the second channel measurements, at least one channel metric for at least one of the set of resources associated with the CSI-RS and a second resource indicator of the at least one of the set of resources. In some cases, the reporting includes reporting a channel metric associated with the at least one of the set of SS blocks. In some instances, the reporting includes reporting an indicator of an antenna port for at least one of the set of SS blocks. In some cases, the reporting may occur periodically, semi-persistently, or aperiodically as identified by the first feedback configuration.

Trigger component 740 may report a trigger or reporting indicator via bus 780 to reporting component 730. In some cases, reporting aperiodically may occur based on a trigger, where the trigger includes receiving a reporting indicator in a downlink control information message 775 or identifying a triggering event based on the first channel measurements.

Figure 8:
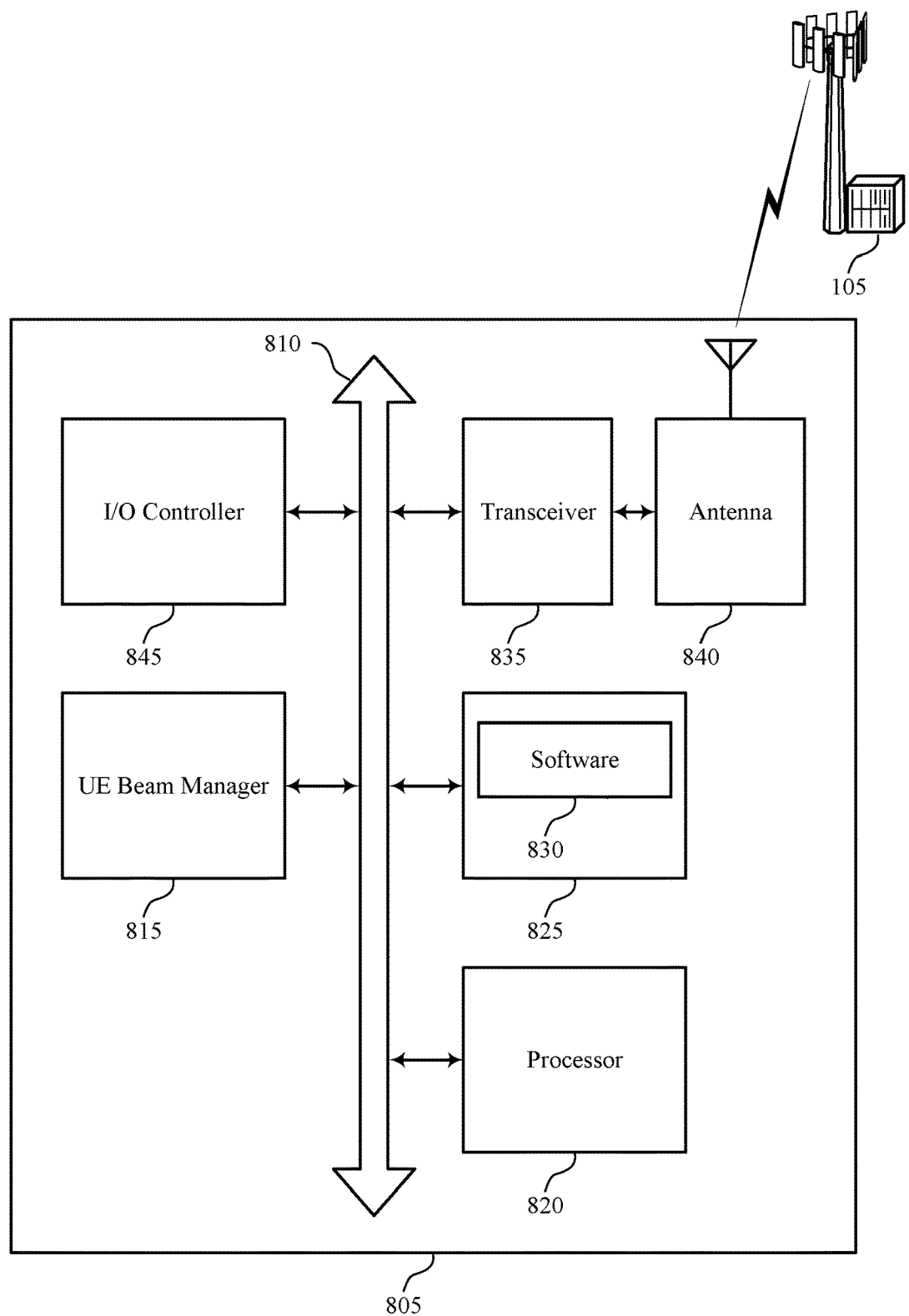
FIG. 8 illustrates a block diagram of a system including a user equipment (UE) that supports beam management using SSs through channel feedback framework in accordance with aspects of the present disclosure.

FIG. 8 shows a diagram of a system 800 including a device 805 that supports beam management using SSs through channel feedback framework in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE beam manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting beam management using SSs through channel feedback framework).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support beam management using SSs through channel feedback framework. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some other cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
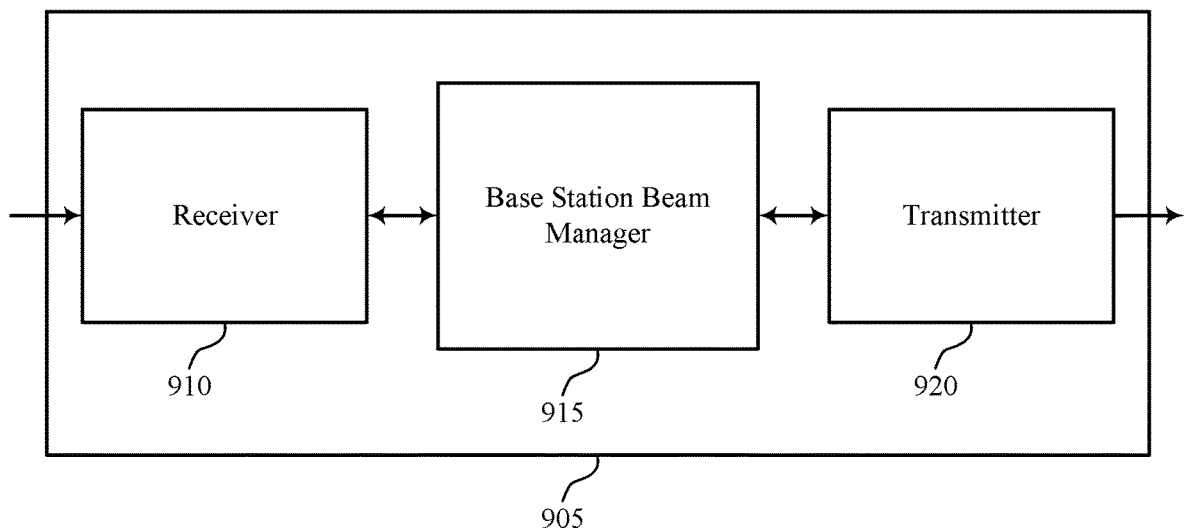
FIGS. 9 through 11 show block diagrams of a device that supports beam management using SSs through channel feedback framework in accordance with aspects of the present disclosure.

FIG. 9 shows a block diagram 900 of a wireless device 905 that supports beam management using SSs through channel feedback framework in accordance with aspects of the present disclosure. Wireless device 905 may be an example of aspects of a base station 105 as described herein. Wireless device 905 may include receiver 910, base station beam manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to beam management using SSs through channel feedback framework). Information may be passed on to other components of the device. The receiver 910 may be an example of aspects of the transceiver 1235 described with reference to FIG. 12. The receiver 910 may utilize a single antenna or a set of antennas.

Base station beam manager 915 may be an example of aspects of the base station beam manager 1215 described with reference to FIG. 12.

Base station beam manager 915 and/or at least some of its various sub-components may be implemented in hardware, software executed by a processor, firmware, or any combination thereof. If implemented in software executed by a processor, the functions of the base station beam manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station beam manager 915 and/or at least some of its various sub-components may be physically located at various positions, including being distributed such that portions of functions are implemented at different physical locations by one or more physical devices. In some examples, base station beam manager 915 and/or at least some of its various sub-components may be a separate and distinct component in accordance with various aspects of the present disclosure. In other examples, base station beam manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station beam manager 915 may configure, for a UE, a first feedback resource set and reporting configuration according to a CSI framework that indicates a set of SS blocks of an SS burst transmitted by the base station using a first set of transmission beams, receive, from the UE, a first resource indicator of at least one of the set of SS blocks, and determine a characteristic of a transmission beam for a data or control transmission to the UE based on the first resource indicator.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
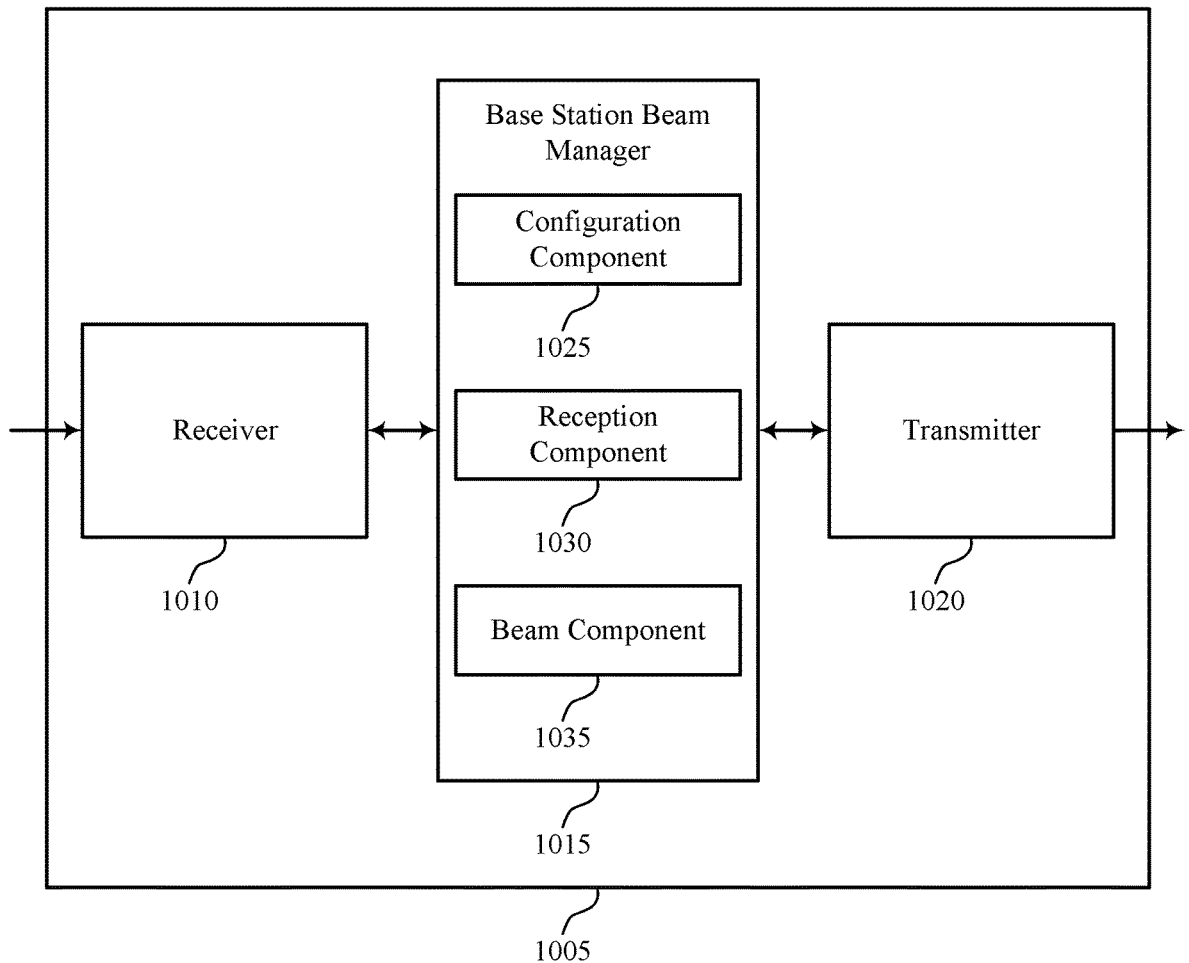

FIG. 10 shows a block diagram 1000 of a wireless device 1005 that supports beam management using SSs through channel feedback framework in accordance with aspects of the present disclosure. Wireless device 1005 may be an example of aspects of a wireless device 905 or a base station 105 as described with reference to FIG. 9. Wireless device 1005 may include receiver 1010, base station beam manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to beam management using SSs through channel feedback framework). Information may be passed on to other components of the device. The receiver 1010 may be an example of aspects of the transceiver 1235 described with reference to FIG. 12. The receiver 1010 may utilize a single antenna or a set of antennas.

Base station beam manager 1015 may be an example of aspects of the base station beam manager 1215 described with reference to FIG. 12.

Base station beam manager 1015 may also include configuration component 1025, reception component 1030, and beam component 1035.

Configuration component 1025 may configure, for a UE, a first feedback resource set and reporting configuration according to a CSI framework that indicates a set of SS blocks of an SS burst transmitted by the base station using a first set of transmission beams. Configuration component 1025 may also configure, for the UE, a second feedback resource set and reporting configuration according to the CSI framework, where the second feedback resource set and reporting configuration identifies a set of resources associated with a CSI-RS transmitted by the base station using a second set of transmission beams. In some cases, the set of SS blocks includes a subset of SS blocks of the SS burst. In some cases, the first feedback resource set and reporting configuration includes an indication for periodic, semi-persistent, or aperiodic reporting, a spatial quasi-colocation indicator for at least one of the set of SS blocks, an indicator of resources for the set of SS blocks, an indicator of a duration of the SS burst, an indicator of antenna ports associated with the set of SS blocks, an indicator of a number of SS blocks of the SS burst, an indicator of a channel metric for reporting for the set of SS blocks, or a combination thereof.

Reception component 1030 may receive, from the UE, a first resource indicator of at least one of the set of SS blocks. In some cases, the receiving includes receiving a channel metric associated with the at least one of the set of SS blocks. In some cases, the receiving includes receiving an indicator of an antenna port for the at least one of the set of SS blocks.

Beam component 1035 may determine a characteristic of a transmission beam for a data or control transmission to the UE based on the first resource indicator.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
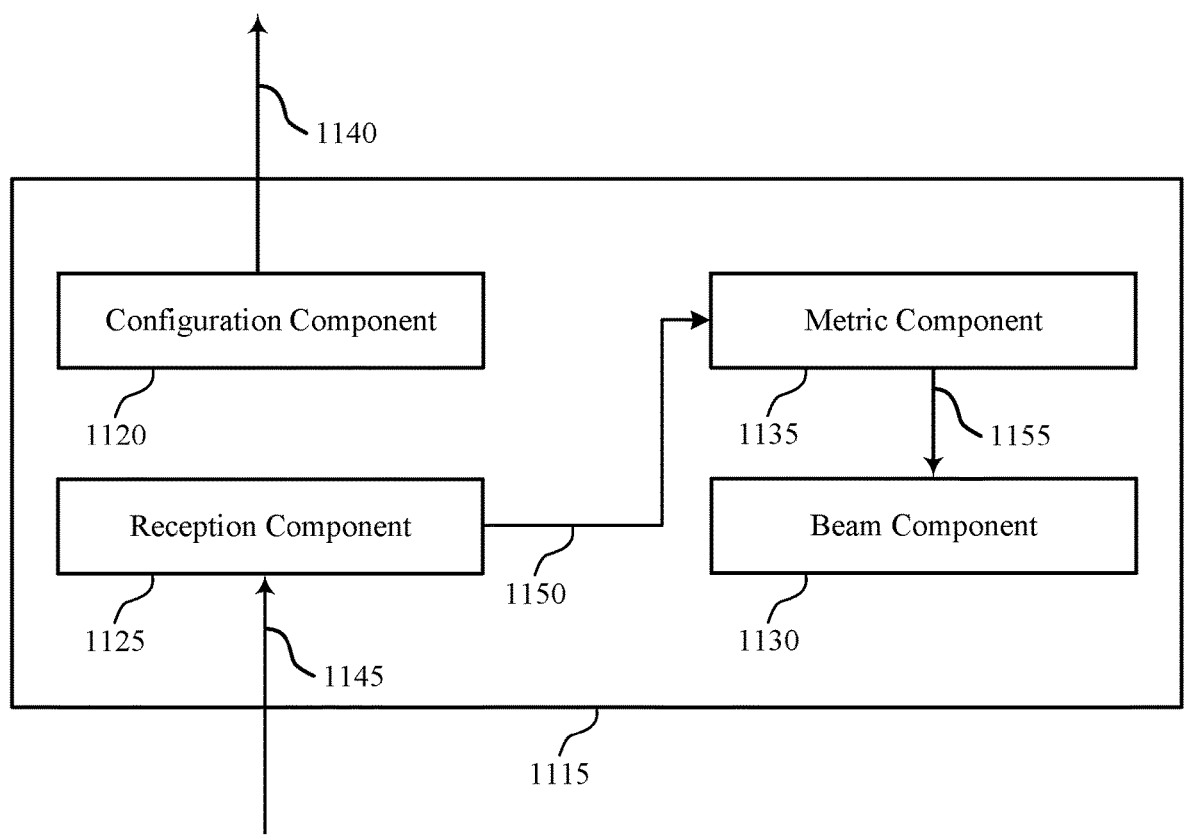

FIG. 11 shows a block diagram 1100 of a base station beam manager 1115 that supports beam management using SSs through channel feedback framework in accordance with aspects of the present disclosure. The base station beam manager 1115 may be an example of aspects of a base station beam manager 1215 described with reference to FIGS. 9, 10, and 12. The base station beam manager 1115 may include configuration component 1120, reception component 1125, beam component 1130, and metric component 1135. Each of these modules may communicate, directly or indirectly, with one another (e.g., via one or more buses).

Configuration component 1120 may configure, for a UE, a first feedback resource set and reporting configuration according to a CSI framework that indicates a set of SS blocks of an SS burst transmitted by the base station using a first set of transmission beams. Configuration component 1120 may also configure, for the UE, a second feedback resource set and reporting configuration according to the CSI framework, where the second feedback resource set and reporting configuration identifies a set of resources associated with a CSI-RS transmitted by the base station using a second set of transmission beams. In some cases, the set of SS blocks includes a subset of SS blocks of the SS burst. Configuration component 1120 may transmit (e.g., via transmitter 920, 1020) a feedback resource set and reporting configuration 1140 to a UE.

In some cases, the first feedback resource set and reporting configuration includes an indication for periodic, semi-persistent, or aperiodic reporting, a spatial quasi-colocation indicator for at least one of the set of SS blocks, an indicator of resources for the set of SS blocks, an indicator of a duration of the SS burst, an indicator of antenna ports associated with the set of SS blocks, an indicator of a number of SS blocks of the SS burst, an indicator of a channel metric for reporting for the set of SS blocks, or a combination thereof.

Reception component 1125 may receive (e.g., via receiver 910, 1010), from the UE, information 1145. Information 1145 may include a first resource indicator of at least one of the set of SS blocks. In some cases, the receiving includes receiving a channel metric associated with the at least one of the set of SS blocks. In some cases, the receiving includes receiving an indicator of an antenna port for the at least one of the set of SS blocks. Reception component 1125 may pass along information 1150 to metric component 1135.

Metric component 1135 may receive at least one channel metric, from a UE, for at least one of the set of resources associated with the CSI-RS and a second resource indicator of the at least one of the set of resources, where the determining the characteristic of the transmission beam is based on the at least one channel metric. Metric component 1135 may relay information 1155 regarding channel metrics to beam component 1130.

Beam component 1130 may determine a characteristic of a transmission beam for a data or control transmission to the UE based on the first resource indicator received via information 1155.

Figure 12:
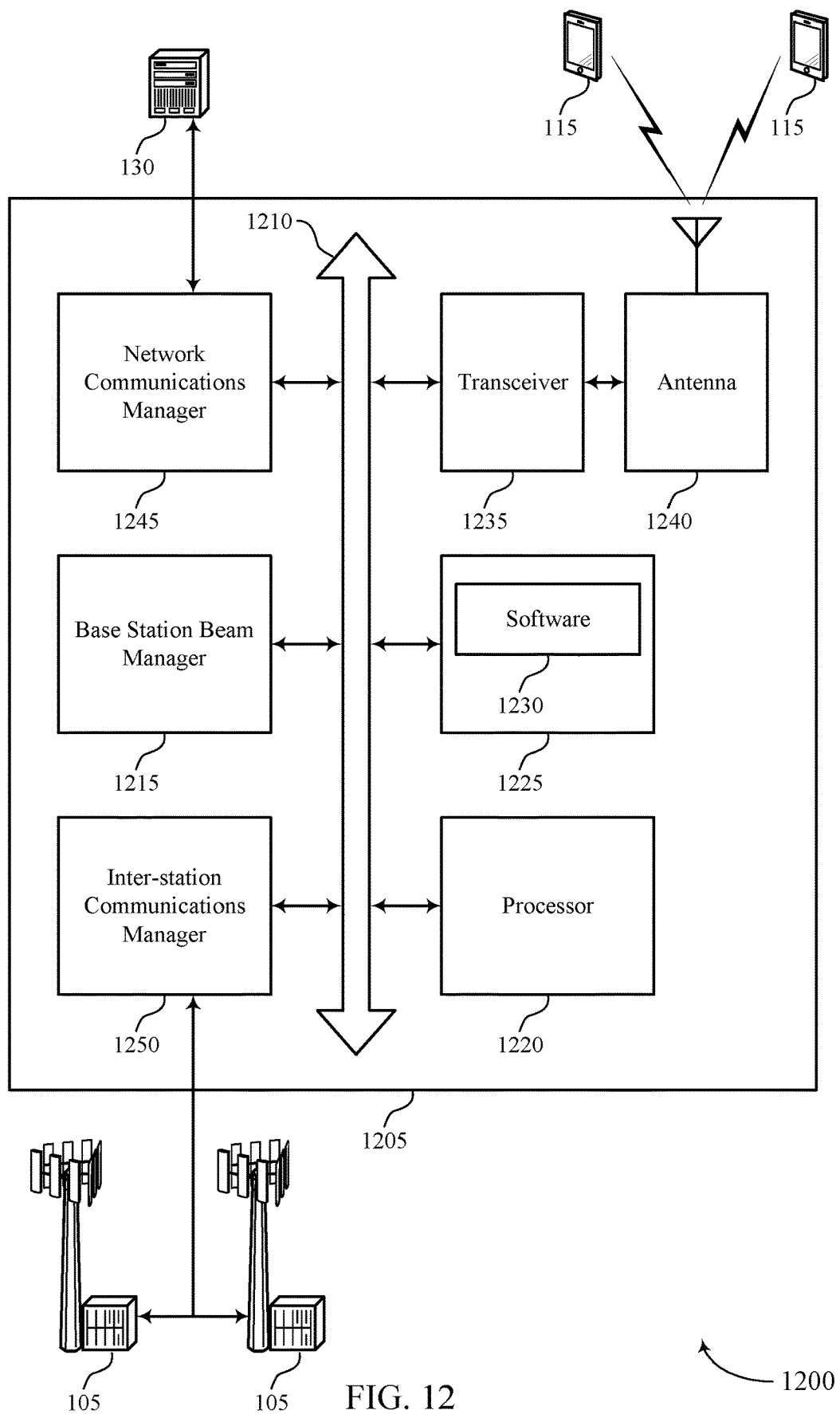
FIG. 12 illustrates a block diagram of a system including a base station that supports beam management using SSs through channel feedback framework in accordance with aspects of the present disclosure.

FIG. 12 shows a diagram of a system 1200 including a device 1205 that supports beam management using SSs through channel feedback framework in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station beam manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting beam management using SSs through channel feedback framework).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support beam management using SSs through channel feedback framework. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network 130 (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
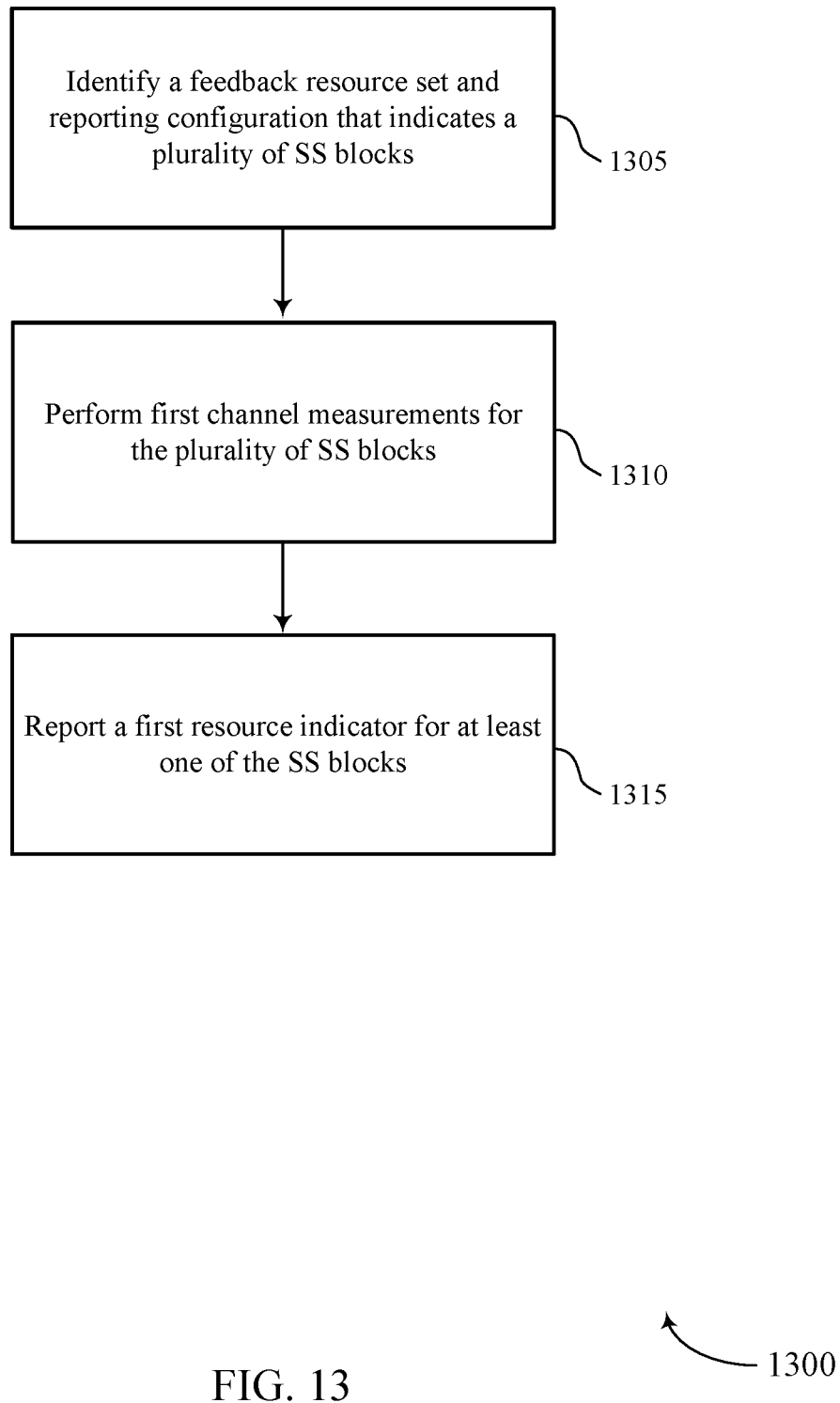
FIGS. 13 and 14 illustrate methods that support beam management using SSs through channel feedback framework for in accordance with aspects of the present disclosure.

FIG. 13 shows a flowchart illustrating a method 1300 for beam management using SSs through channel feedback framework. The operations of method 1300 may be implemented by a UE 115 or its components as described herein. For example, the operations of method 1300 may be performed by a UE beam manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify a feedback resource set and reporting configuration according to a CSI framework. The feedback resource set and reporting configuration may indicate a plurality of SS blocks of an SS burst transmitted by a base station 105 using a first set of transmission beams. In some cases, the UE 115 may receive the first feedback resource set and reporting configuration from the base station 105. The operations of block 1305 may be performed according to the methods described herein. In certain examples, aspects of the operations of block 1305 may be performed by a configuration component as described with reference to FIGS. 6 and 7.

At block 1310, the UE 115 may perform first channel measurements for the plurality of SS blocks. The operations of block 1310 may be performed according to the methods described herein. In certain examples, aspects of the operations of block 1310 may be performed by a measurement component as described with reference to FIGS. 6 and 7.

At block 1315, the UE 115 may report, to the base station 105, a first resource indicator for at least one of the plurality of SS blocks based on the first channel measurements. In some examples, the UE may report a channel metric associated with the at least one of the plurality of SS blocks. The reporting may occur periodically, semi-persistently, or aperiodically as identified by the first reporting configuration. Further, the aperiodic reporting may occur based on a trigger, where the trigger includes receiving a reporting indicator in a DCI message or identifying a triggering event based on the first channel measurements. The operations of block 1315 may be performed according to the methods described herein. In certain examples, aspects of the operations of block 1315 may be performed by a reporting component as described with reference to FIGS. 6 and 7.

Figure 14:
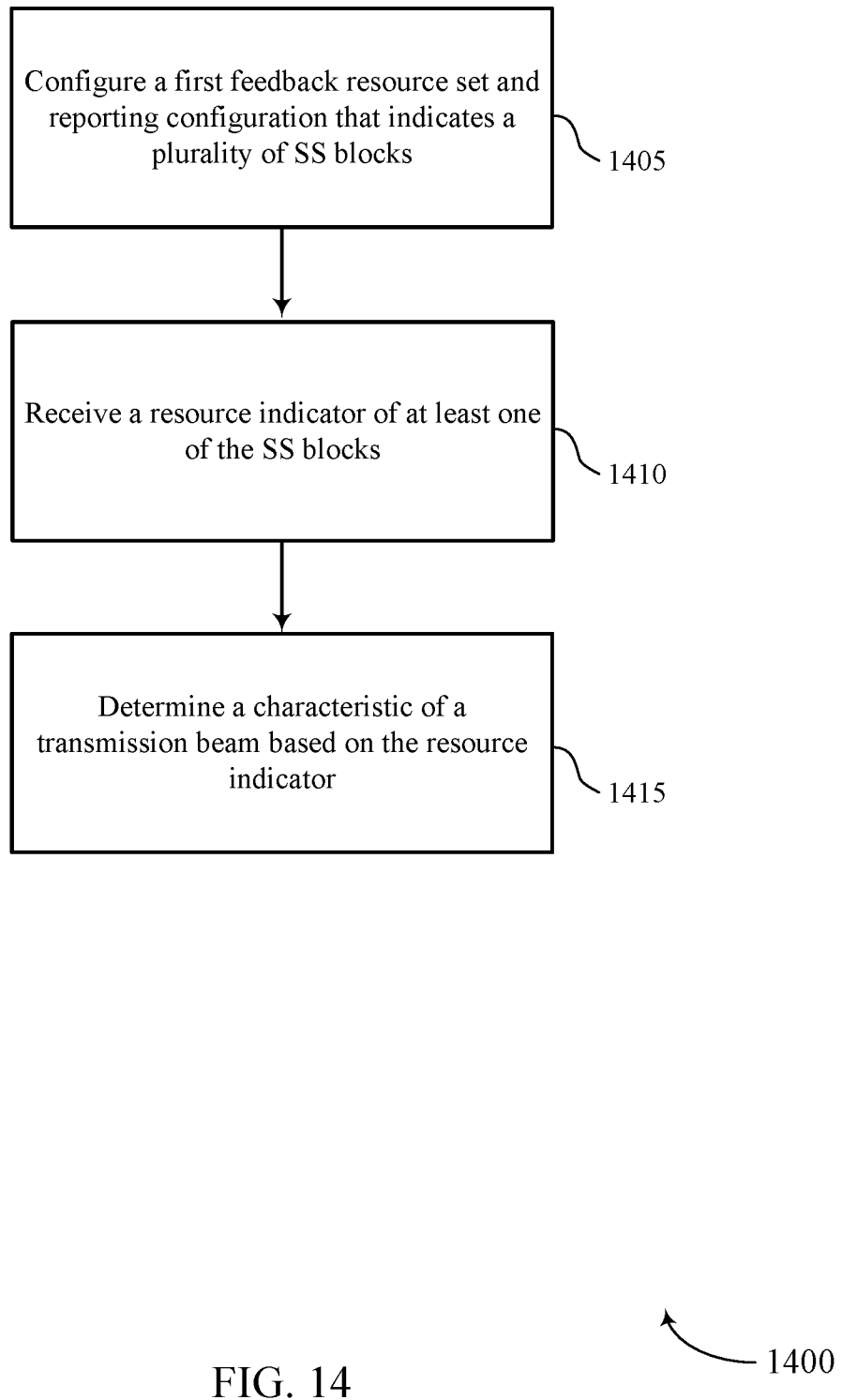

FIG. 14 shows a flowchart illustrating a method 1400 for beam management using SSs through channel feedback framework. The operations of method 1400 may be implemented by a base station 105 or its components as described herein. For example, the operations of method 1400 may be performed by a base station beam manager as described with reference to FIGS. 9 through 11. In some examples, a base station 105 may execute a set of codes to control the functional elements of the device to perform the functions described below. Additionally or alternatively, the base station 105 may perform aspects of the functions described below using special-purpose hardware.

At block 1405, the base station 105 may configure, for a UE 115, a first feedback resource set and reporting configuration according to a CSI framework that indicates a plurality of SS blocks of an SS burst transmitted by the base station using a first set of transmission beams. The feedback resource set and reporting configuration may include an indication for periodic, semi-persistent, or aperiodic reporting, a spatial quasi-colocation indicator for at least one of the plurality of SS blocks, an indicator of resources for the plurality of SS blocks, an indicator of a duration of the SS burst, an indicator of antenna ports associated with the plurality of SS blocks, an indicator of a number of SS blocks of the SS burst, an indicator of a channel metric for reporting for the plurality of SS blocks, or combination thereof. The operations of block 1405 may be performed according to the methods described herein. In certain examples, aspects of the operations of block 1405 may be performed by a configuration component as described with reference to FIGS. 10 and 11.

At block 1410, the base station 105 may receive, from the UE 115, a first resource indicator of at least one of the plurality of SS blocks. In some instances, the base station 105 may receive a channel metric associated with the at least one of the plurality of SS blocks. In some other cases, the base station 105 may receive an indicator of an antenna port for the at least one of the plurality of SS blocks. The operations of block 1410 may be performed according to the methods described herein. In certain examples, aspects of the operations of block 1410 may be performed by a reception component as described with reference to FIGS. 10 and 11.

At block 1415, the base station 105 may determine a characteristic of a transmission beam for a data or control transmission to the UE 115 based on the first resource indicator. The base station 105 may determine the characteristic of the transmission beam based on at least one channel metric. The operations of block 1415 may be performed according to the methods described herein. In certain examples, aspects of the operations of block 1415 may be performed by a beam component as described with reference to FIGS. 10 and 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next gNB, or base station may provide communication coverage for a macro cell, a small cell, or other types of cell. The term "cell" may be used to describe a base station, a carrier or CC associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. As used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
    a memory; and
    at least one processor coupled to the memory, wherein the apparatus is configured to:
    receive a resource set configuration associated with a channel state information reference signal (CSI-RS) framework, wherein the resource set configuration indicates a synchronization signal (SS) block resources for beam measurement and indicates a reporting configuration for reporting beam information associated with the SS block resources; and
    report, in accordance with the reporting configuration, an indicator corresponding to at least one SS block resource of the SS block resources.

2. The apparatus of claim 1, wherein to receive the resource set configuration, the apparatus is configured to:
    receive radio resource control (RRC) signaling comprising the resource set configuration.

3. The apparatus of claim 1, wherein the reporting configuration comprises an indicator of a number of the SS block resources of an SS burst.

4. The apparatus of claim 1, wherein to report, in accordance with the reporting configuration, the indicator, the apparatus is configured to:

report, in accordance with the reporting configuration, two or more resource indicators, the two or more resource indicators comprising the indicator corresponding to the at least one SS block resource of the SS block resources.

5. The apparatus of claim 1, wherein the reporting configuration indicates a spatial quasi-colocation indicator for at least one SS block resource of the SS block resources or an indicator of a duration of an SS burst that comprises the SS block resources.

6. The apparatus of claim 1, wherein an SS burst comprises the SS block resources.

7. The apparatus of claim 1, wherein the SS block resources are a subset of SS blocks of an SS burst.

8. The apparatus of claim 1, wherein each SS block resource of the SS block resources is a respective SS block.

9. The apparatus of claim 1, wherein the indicator corresponds to a measured metric.

10. The apparatus of claim 9, wherein the measured metric is reference signal received power (RSRP).

11. The apparatus of claim 10, wherein the indicator is a resource indicator.

12. The apparatus of claim 1, wherein the apparatus is configured to measure, in accordance with the resource set configuration, a metric corresponding to the SS block resources.

13. The apparatus of claim 12, wherein the indicator corresponds to the measured metric.

14. The apparatus of claim 13, wherein an SS burst comprises the SS block resources.

15. The apparatus of claim 13, wherein the SS block resources are a subset of SS blocks of an SS burst.

16. The apparatus of claim 13, wherein each SS block resource of the SS block resources is a respective SS block.

17. The apparatus of claim 13, wherein the measured metric is reference signal received power (RSRP).

18. The apparatus of claim 17, wherein the indicator is a resource indicator.

19. A method of wireless communication performed by an apparatus, the method comprising:
receiving a resource set configuration associated with a channel state information reference signal (CSI-RS) framework, wherein the resource set configuration indicates synchronization signal (SS) block resources for beam measurement and indicates a reporting configuration for reporting beam information associated with the SS block resources; and
reporting, in accordance with the reporting configuration, an indicator corresponding to at least one SS block resource of the SS block resources.

20. The method of claim 19, wherein receiving the resource set configuration comprises:
receiving receive radio resource control (RRC) signaling comprising the resource set configuration.

21. The method of claim 19, wherein the reporting configuration comprises an indicator of a number of the SS block resources of an SS burst.

22. The method of claim 19, wherein reporting, in accordance with the reporting configuration, the indicator comprises:
reporting, in accordance with the reporting configuration, two or more resource indicators, the two or more resource indicators comprising the indicator corresponding to the at least one SS block resource of the SS block resources.

23. The method of claim 19, wherein the reporting configuration indicates a spatial quasi-colocation indicator for at least one SS block resource of the SS block resources or an indicator of a duration of an SS burst that comprises the SS block resources.

24. The method of claim 19, wherein an SS burst comprises the SS block resources.

25. The method of claim 19, wherein the SS block resources are a subset of SS blocks of an SS burst.

26. The method of claim 19, wherein each SS block resource of the SS block resources is a respective SS block.

27. The method of claim 19, wherein the indicator corresponds to a measured metric.

28. The method of claim 27, wherein the measured metric is reference signal received power (RSRP).

29. The method of claim 28, wherein the indicator is a resource indicator.

30. The method of claim 19, further comprising:
measuring, in accordance with the resource set configuration, a metric corresponding to the SS block resources.

31. The method of claim 30, wherein the indicator corresponds to the measured metric.

32. The method of claim 31, wherein an SS burst comprises the SS block resources.

33. The method of claim 31, wherein the SS block resources are a subset of SS blocks of an SS burst.

34. The method of claim 31, wherein each SS block resource of the SS block resources is a respective SS block.

35. The method of claim 31, wherein the measured metric is reference signal received power (RSRP).

36. The method of claim 35, wherein the indicator is a resource indicator.

37. An apparatus for wireless communication, comprising:
means for receiving a resource set configuration associated with a channel state information reference signal (CSI-RS) framework, wherein the resource set configuration indicates synchronization signal (SS) block resources for beam measurement and indicates a reporting configuration for reporting beam information associated with the SS block resources; and
means for reporting, in accordance with the reporting configuration, an indicator corresponding to at least one SS block resource of the SS block resources.

38. A non-transitory computer-readable medium having code stored thereon that, when executed by a processor, causes the processor to:
receive a resource set configuration associated with a channel state information reference signal (CSI-RS) framework, wherein the resource set configuration indicates synchronization signal (SS) block resources for beam measurement and indicates a reporting configuration for reporting beam information associated with the SS block resources; and
report, in accordance with the reporting configuration, an indicator corresponding to at least one SS block resource of the SS block resources.

* * * * *